United States Patent [19]
Webber et al.

[11] Patent Number: 6,003,654
[45] Date of Patent: Dec. 21, 1999

[54] AUTOMATIC BOTTLE RACK LOADER

[76] Inventors: Leslie G. Webber; Larry R. Bartko, both of 1621 N. Broadway, Stockton, Calif. 95205

[21] Appl. No.: 08/936,296

[22] Filed: Sep. 25, 1997

[51] Int. Cl.[6] .................................................... B65G 1/10
[52] U.S. Cl. ...................................... 198/408; 414/331.13
[58] Field of Search ........................... 414/331, 331.01, 414/331.13, 331.14, 331.16; 198/408, 412, 413

[56] References Cited

U.S. PATENT DOCUMENTS

| | | | |
|---|---|---|---|
| 2,661,100 | 12/1953 | Ashford | 414/331 |
| 2,718,972 | 9/1955 | Temple | 414/331 X |
| 3,637,095 | 1/1972 | Kampfer | 414/331 |
| 3,759,401 | 9/1973 | Kreuz et al. | 198/412 X |
| 4,106,647 | 8/1978 | Robert | 198/413 X |
| 4,379,671 | 4/1983 | Cochran | 414/331 |
| 4,621,969 | 11/1986 | Berghäll et al. | 414/331 |
| 4,634,333 | 1/1987 | Butterly, Jr. et al. | 414/331 |
| 5,160,013 | 11/1992 | McDowell | 198/412 |
| 5,244,330 | 9/1993 | Tonjes | 414/331 |
| 5,310,300 | 5/1994 | Crabb et al. | 198/408 X |
| 5,727,917 | 3/1998 | Fuke et al. | 414/331 |

FOREIGN PATENT DOCUMENTS

1142383  2/1985  U.S.S.R. ............................. 198/408

Primary Examiner—David A. Bucci
Attorney, Agent, or Firm—Joseph L. Strabala

[57] ABSTRACT

A compact machine for automatically loading racks with bottled water containers, includes an in feed conveyor for delivering upright bottles, a pin wheel mechanism with spaced apart spokes for receiving each individual bottle from the in feed conveyor that is operable through its rotation to convert a bottle's vertical orientation to a horizontal orientation, a bottle loading magazine operable to transfer bottles from the pin wheel mechanism to a elevator magazine, a bottle elevator in the loading magazine operable to raise bottles loaded therein in a vertically stacked relationship, and a ram operable to push the bottles stacked in the elevator magazine into a rack positioned next to the elevator magazine, plus controls for sequencing these operations.

4 Claims, 10 Drawing Sheets

AUTOMATIC BOTTLE RACK LOADER

BACKGROUND OF THE INVENTION

Due to less than satisfactory water quality in many cities in the United States, and elsewhere, individuals often purchase bottled drinking water which comes from a wide variety of sources. Often such customers buy spring water which is bottled in five gallon plastic containers that are mounted in dispensing units in offices and homes, whereby the water in bottles can be dispensed into cups or the like placed under the spigot of the dispensing unit, commonly called the "water cooler."

Since a customer has to lift the bottles and invert them on the water cooler, after the cap is removed, to replenish the water in the cooler, the five gallon size for the bottles is preferred, if not mandated. Not counting the weight of the bottles, the water contained in these bottles weighs approximately forty-four (44) pounds, not an insubstantial amount to lift and guide into the top opening of the water cooler. For this reason the plastic bottles used for such water handling are light weight, weighing only a few pounds, which dictates the thin walled plastic bottles conventionally used to distribute bottled water.

Due to the thin wall of the plastic bottles coupled with the weight of the water, these bottles are somewhat fragile and must be handled with care to avoid rupturing the bottles and/or disrupting the seal of the cap. The above characteristics relating to the bottles and the weight of the water poses problems in the initial distribution phases of providing such bottled water to customers.

The delivery process for such bottled water involves filling the plastic bottles with spring water, or the like, capping the bottles with plastic caps and loading them into racks for delivery to customers. Typically the rack (two of which are illustrated in the drawings, FIGS. 1 and 2, described infra,) hold 24 bottles of water (sometimes more depending on the rack size), with each bottle supported by rails in an individual compartment holding two bottles. These racks are typically equipped with spaced apart tunnels or feet at the bottom of the rack for a fork lift by which the racks are loaded on the sides of a delivery truck with a slight inward incline. As a result the delivery driver may access the two bottles in each compartment from the side of the delivery truck. Empty bottles are stored in the racks for return to the bottling plant when full bottles are exchanged for empty bottles at a customer's location.

Small bottled water producers often load the racks by hand with a crew receiving the filled bottles from a filling line, lifting the bottles and guiding them into the compartments in the racks and then pushing them back along the rails so that two bottles can be placed in each compartment. When the racks have compartments four high, the crew must lift the roughly fifty pound bottles four plus feet in the air to place them in the racks. Such manual loading requires considerable physical exertion to load a single rack containing twenty-four water filled bottles. Since the bottles are somewhat fragile, the crew must not "bang" the bottles against the rack or its rails, lest the bottles rupture or the hydraulic action of the water within the bottle breaks or disturbs the cap seal, leading to leakage of the water from the bottle.

Obviously the labor intensive loading of these bottles in racks manually, places the crew at risk for on the job injury from the difficult and repetitive lifting involved. Larger bottled water producers therefore have resorted to large machines for automatically loading water filled bottles of the type described into racks, some machines costing in the range of $250,000. Such machines often consume significant floor space and require high vertical clearances for the machine, e.g., vertical clearances of two stories or more. One such prior art machine is disclosed in U.S. Letters Pat. No. 4,929,140 issued to Baker and another is disclosed in U.S. Letters Pat. No. 5,244,330 issued to Tonjes.

This invention is related to a machine for automatically loading the water filled bottles into the delivery racks mentioned above which is far less expensive than the machines disclosed in the patents mentioned.

Thus, an object of this invention is to provide a bottle water loading machine which has a small horizontal and vertical footprint which is affordable for small bottled water producers.

Further, another object of this invention is to provide a special mechanism which orients the water filled bottles gently from a vertical orientation to a horizontal position in order to avoid rupture of the bottles and/or creating cap "leakers" during an automatic loading process.

Still another object of the invention is to provide a machine which costs only about a third of the price of the machines now available in the market place.

A very important feature of the novel machine is its open architecture which allows for easy maintenance and repair.

Other advantages and objects of the invention will be appreciated by referring to the accompanying drawings and the following specification describing the invention, including a feature allowing the machine to accommodate different rack configurations when desired by the operator.

DESCRIPTION OF THE DRAWINGS

The invention will be better understood by referring to the attached drawings wherein.

SUMMARY OF THE INVENTION

This invention related to a machine for loading racks with filled bottles includes a conveyor means operable to receive bottles in the vertical position from a bottle filling station, a pin wheel mechanism operably connected to receive bottles from the conveyor, with the pin wheel mechanism having an elongated armature mounted for rotation therein, the armature having a plurality of spokes mounted thereon in a paired spaced apart, parallel relationship at 90 degree intervals whereby a pair of the spokes of the pin wheel mechanism are located under the base of each bottle received from the conveyor, control means operable to cause the wheel mechanism to rotate one quarter turn when a bottle received from the conveyor is detected whereby such a bottle is gently changed from a vertical orientation to a horizontal orientation while operably supported by the spokes, displacement means associated with the pin wheel mechanism operable to displace any bottle supported on the spokes in a horizontal position so such bottle will be re-positioned clear of the spokes of the pin wheel mechanism; and loading means operable to move horizontally oriented bottles displaced from the pin wheel mechanism in to a rack located next to said machine.

The machine can also include system for storing the bottles displaced from the pin wheel mechanism until a desired number are ready for loading into the rack.

The pin wheel bottle mechanism is an essential part and more specifically includes an elongated armature mounted for rotation in said machine with its longitudinal axis located horizontally, eight spokes mounted on said armature, with the spokes mounted on said armature normal to the longitudinal axis of said armature and at 90 degree intervals in spaced apart paired, parallel relationships; in feed means operable to deliver a bottle to be repositioned over one pair of the spokes positioned horizontally whereby this pair of spokes will be positioned under the base of such bottle, control means operable to rotate the armature one quarter turn when such bottle has its base positioned over the spokes thereby changing the orientation of such bottle from a vertical position to horizontal position whereby such bottle in such horizontal position will be supported by another pair of spokes; and out feed means operable to displace a bottle with a horizontal orientation from the spokes supporting it after said armature has been rotated one quarter turn by the said control means so the cycle can repeat.

DESCRIPTION OF A PREFERRED EMBODIMENT

Figure 1:
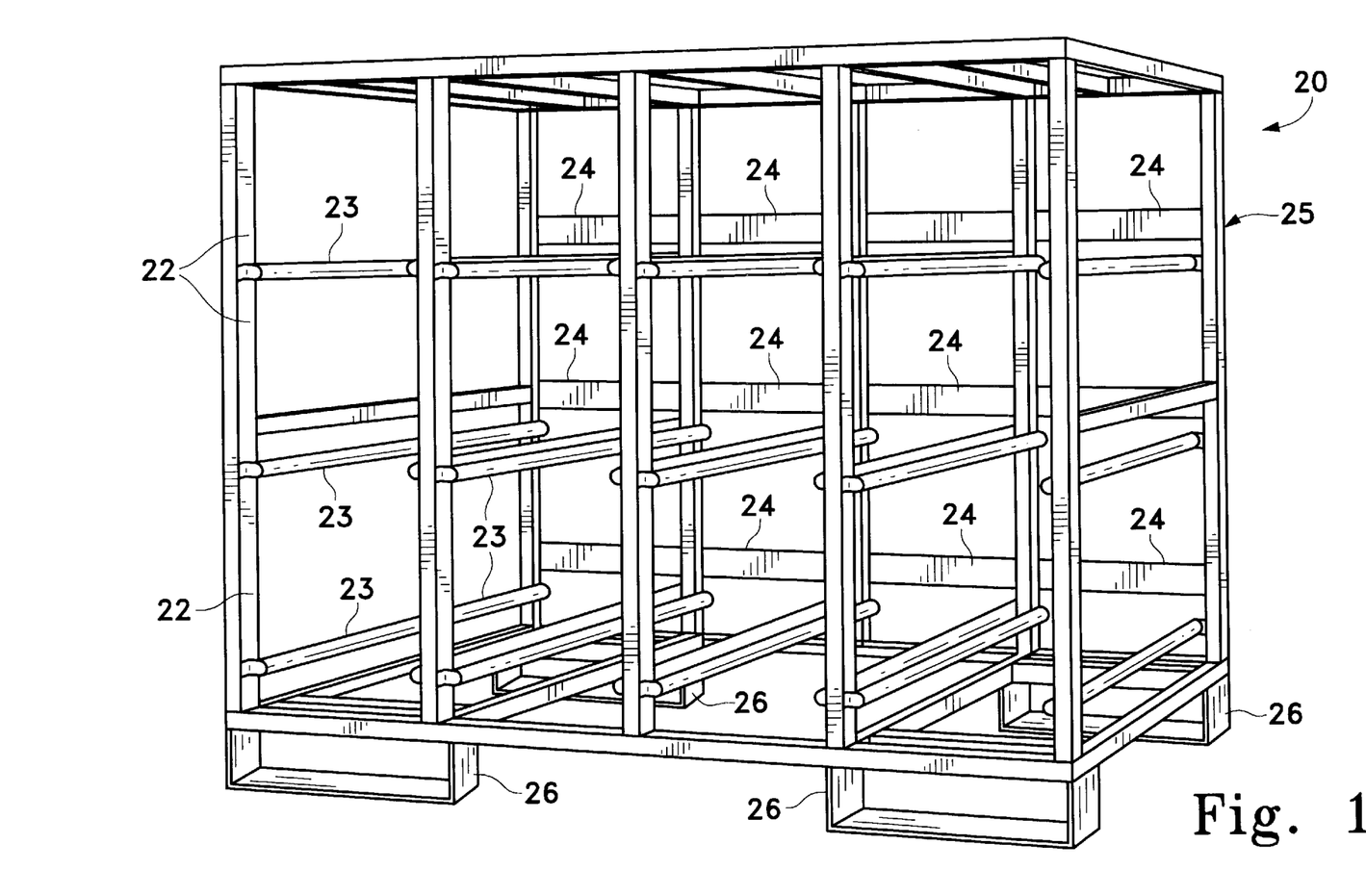
FIG. 1 is a perspective of a typical three by four rack holding twenty four bottles, typically used to transport bottled water from the bottling plant to the customer, which can be loaded by the novel machine of this invention.
Figure 2:
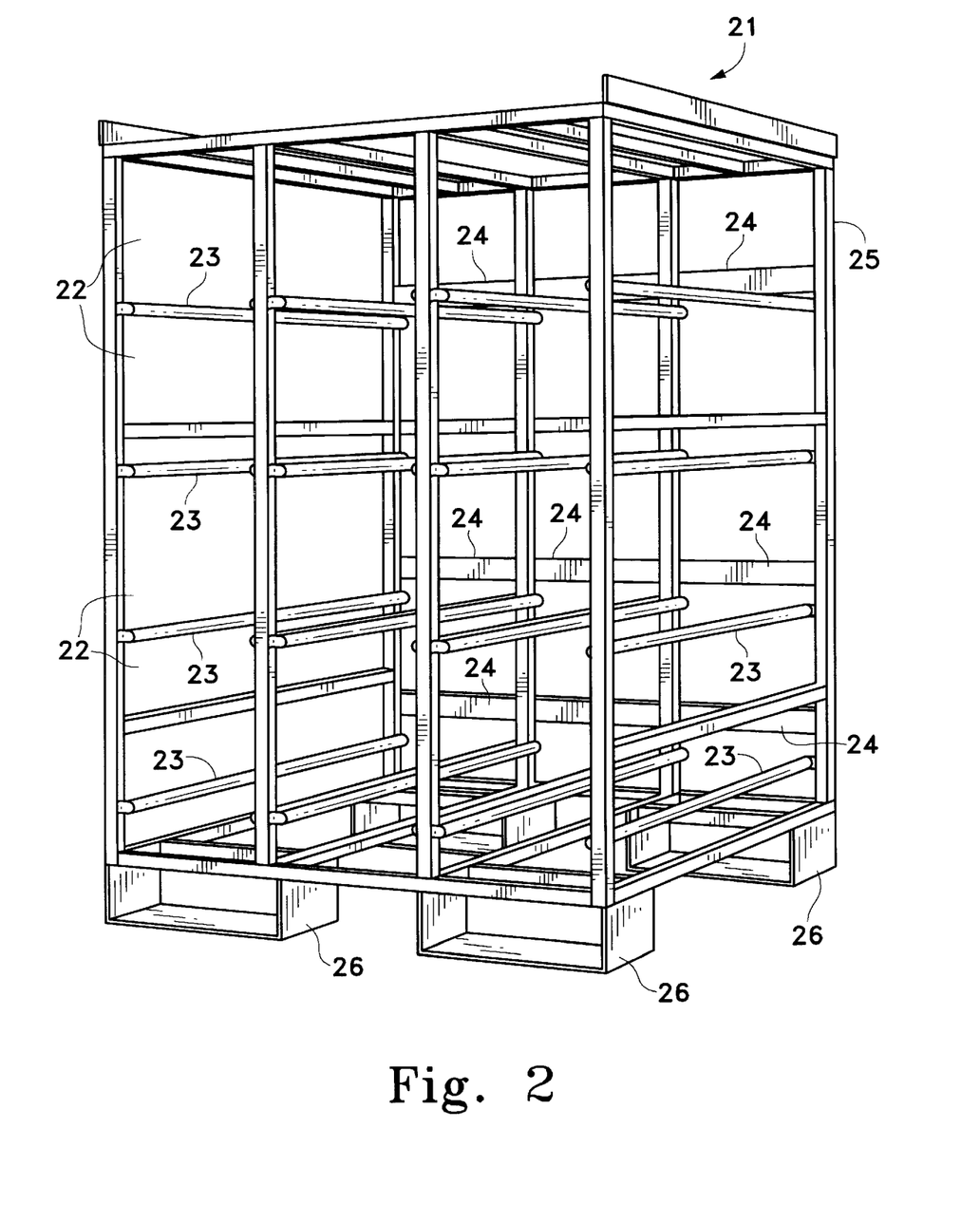
FIG. 2 is a similar perspective of a typical four by three rack holding twenty four bottles, typically used to transport bottled water from the bottling plant to the customer, which can also be loaded by the novel machine of this invention.

To better understand the operating environment of the invention reference is made to FIGS. 1 and 2, illustrating two typical racks 20 and 21, used to transport bottled water from a bottling plant to the customers+ locations. As can be seen in these drawings the racks can be either four by three or three by four in respect to the compartments 22 therein for holding water filled plastic bottles. Typically the racks are built out of angle iron and each compartment includes smooth rails 23 on each side of each compartment and a stop 24 at the rear 25 of the rack. At the bottom of the racks tunnels or hollow feet 26 are provided for the tongs of a fork lift so that the bottle filled rack can be conveniently moved after it is loaded, which, when filled with bottled water and including the weight of the rack, can approach one ton.

To manually load the water filled bottles, which are about eleven inches in diameter and twenty inches high, in either of the two racks 20 and 21, the bottles are turned on their side and placed in the open end of a compartment 22 so the rails 23 support the bottle. Once on the rails the bottle can be slid along the rails, and, if it is the first bottle in the compartment, the bottle is pushed into the compartment on the rails until it abuts against stop 25 and thereafter another bottle can be loaded into the same compartment on the same rails until it abuts against the first bottle in the compartment. Sometimes the second bottle in the same compartment can be used to push the first bottle loaded therein to the stop 25.

At small bottled water producers this loading procedure is carried out by hand, and from FIG. 2 it can be seen that bottles placed in the top rows of this rack must be lifted at least four feet in the air to load the top compartments.

Further, as can be seen in FIGS. 1 and 2 the racks have different configurations, and any machine for placing water filled bottles in such racks must accommodate different rack configurations to be commercially feasible, which is a feature of the current invention.

Figure 3:
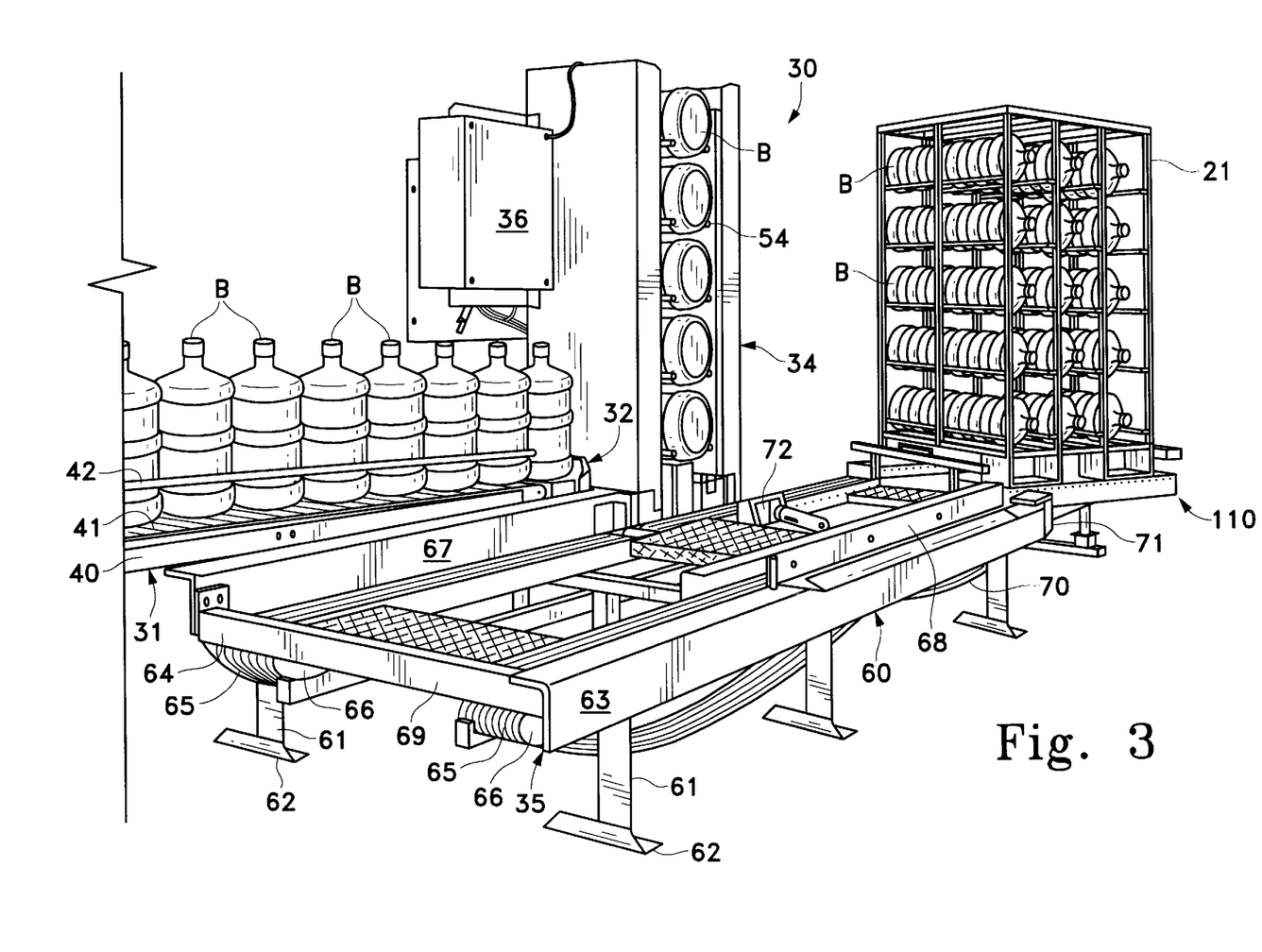
FIG. 3 is a perspective of the novel machine, illustrating, inter alia, the filled bottle feed conveyor to the machine, the elevator magazine where the bottles are stacked and the rack conveyer for moving a rack into position for the bottles to be transferred from the elevator magazine to the rack; also illustrated in FIG. 3, also in perspective, is a conventional rotating rack table which supports a loaded rack after it leaves the rack conveyor and allows the rack to be turned for alignment with a fork lift truck.

In FIG. 3, one embodiment of the novel automatic rack loading machine 30 is illustrated. It includes, as principal components, a bottle conveyer 31 for feeding water filled bottles B to the machine, a pin wheel mechanism 32 for reorienting the vertically positioned bottles on the bottle conveyer to a horizontal position (not fully shown in this figure), a bottle loading magazine 33 (not shown in this figure), an elevator magazine 34 and the large rack conveyor 35, in the foreground of this drawing.

As to the general operation of the novel machine 30, by referring FIGS. 2 and 3, it can be appreciated that if rack 21 (see FIG. 2) is loaded on the rack conveyor 35 and its compartments 22 aligned with the water filled bottles B in the elevator magazine 34, the vertical row of the bottles can be pushed in to the rack by a ram, or rams as the case may be. Thus the novel machine receives water filled bottles on its bottle conveyor 31 in an upright or vertical position and gently reorients these bottles in the pin wheel mechanism 32 from a vertical to a horizontal position, from which the bottles pass into the bottle loading magazine 33 which transfers the bottles into the elevator magazine 34 where the bottles are eventually positioned as shown in FIG. 3 for insertion into a rack, such a rack 21. The sequencing of the above operations, is accomplished by logic in the control system 36.

Figure 4:
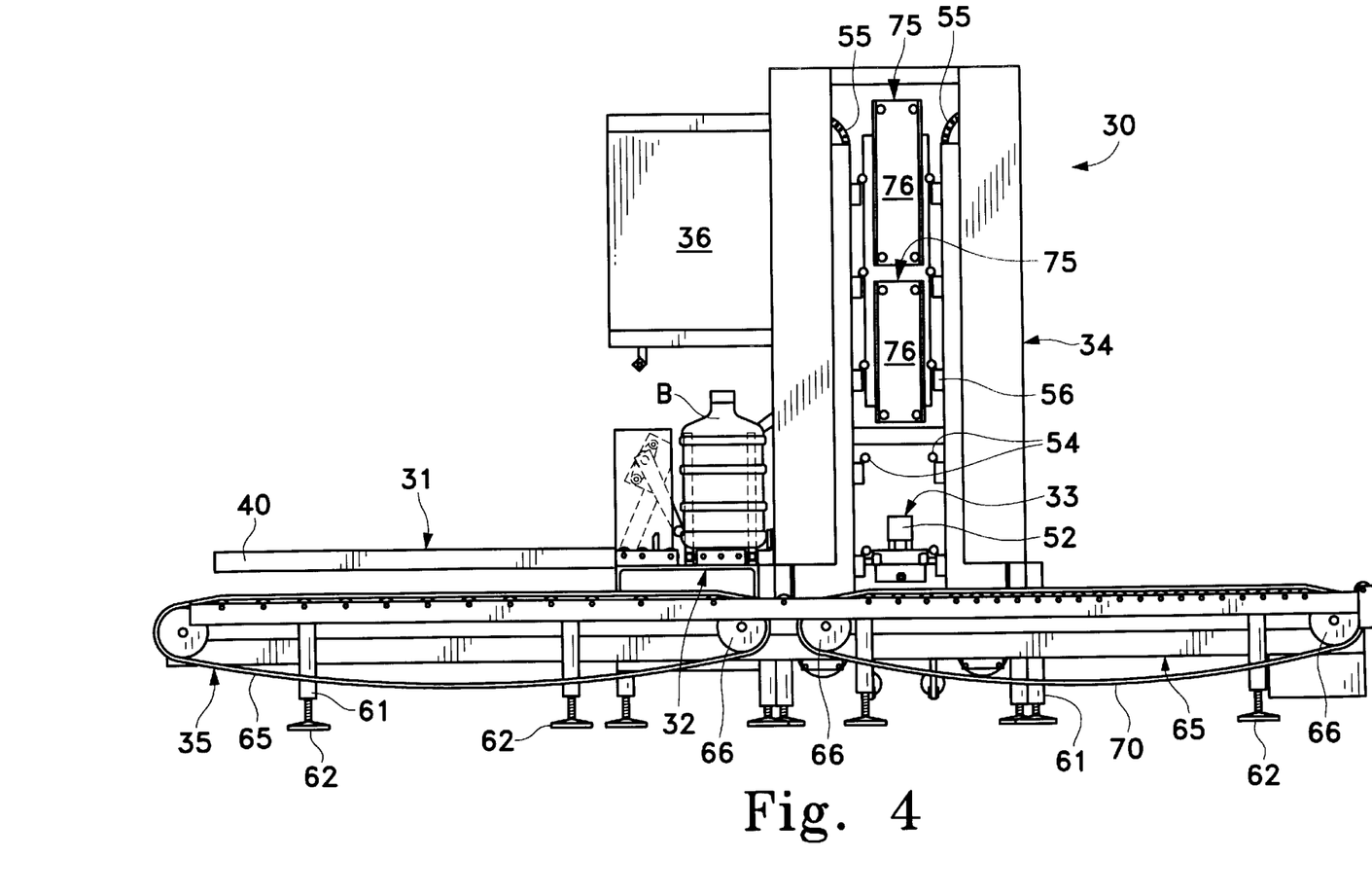
FIG. 4 is an elevation of the novel machine also illustrating, inter alia, the bottle feed conveyor, the elevator magazine and the rack conveyor, along with the magazine loader ram and part of the bottle pin wheel mechanism below the control panel.

From FIGS. 3 and 4 it can be appreciated the novel rack loading machine is very compact having a relative small horizontal foot print and does not require a vertical clearance beyond a standard ceiling, making it very user friendly for the small bottle water producers. However, other operations, such as fork lift handling of the bottle filled racks, may require higher vertical clearances in such facilities.

The sequence of the flow of the bottles B through the machine may be described as follows: the bottles are fed to the machine by an un-powered conveyer 31. This conveyor is typically formed with two, space apart metal runners 40 with a plurality of closely spaced rollers 41 placed between these runners, along with guide rods 42 positioned above the runners to keep the water filled bottles in a single line over the rollers. Typically the bottle filling and capping machine (not shown) feeds the bottles on to this conveyor and provides the impetus which takes the bottles to the pin wheel mechanism 32 in the machine. However this conveyor may be powered if desired without departing from the spirit of the invention or the conveyor inclined slightly so that gravity provides the impetus to deliver the bottles to the pin mechanism.

Figure 6:
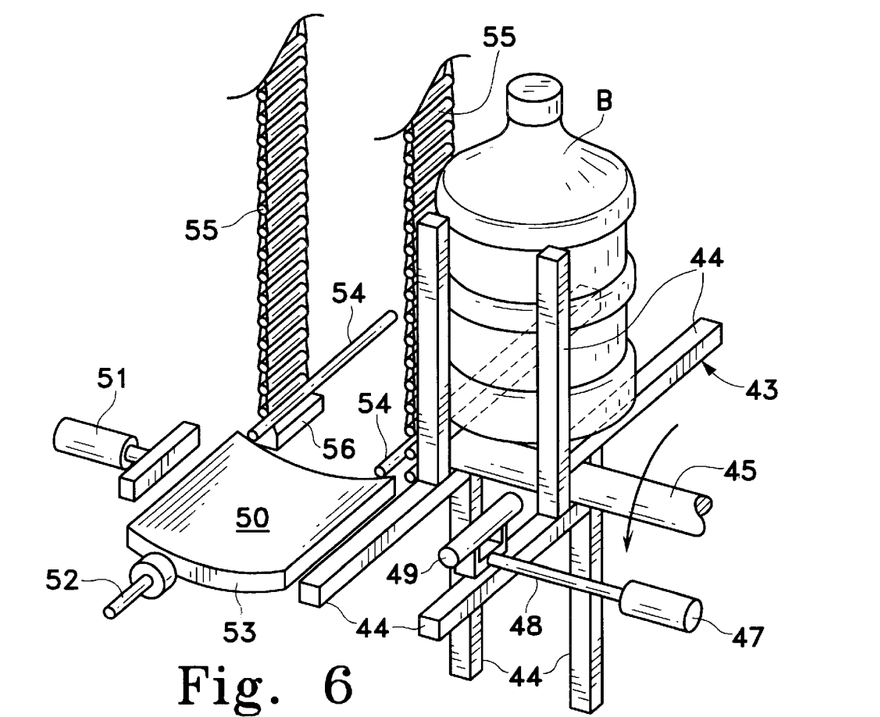
FIG. 6 is a diagrammatic perspective of the bottle pin wheel mechanism that controls the reorientation of a filled bottle from a vertical orientation to a horizontal position along with the ram to loading the elevator mechanism of the machine, along with other components.

One of the innovative parts of the current machine is the pin wheel mechanism 32 which is best shown in FIG. 6 in a diagrammatic illustration. It includes a powered pin wheel 43 which is composed of eight spokes 44 mounted on an armature 45 with four spokes on each end of the armature and aligned so that pairs of spaced apart spokes are located at 90 degree intervals on the armature which is mounted on bearings (not shown) for intermittent rotation. It can be seen that a bottle B is received from the conveyor 31 so that it is positioned over two of the spaced apart spokes of the pin wheel. Once a filed bottle is in such a position, the pin wheel rotates on its armature one quarter turn. As the rotation occurs the bottle will be supported on the pair of vertical spokes moving from a vertical position to a horizontal position as can be appreciated in the illustration in FIG. 6.

The transition of the bottle B from its vertical position to a horizontal position in the pin wheel mechanism 32 is accomplished smoothly and gently as when the pin wheel turns the bottle slides down the horizontal spokes, as they move to a vertical position, so that the bottle is immediately supported on the spokes moving from a vertical to a horizontal position. After a quarter turn the pin wheel stops and the bottle is located in a horizontal position, resting on spokes 44. In this position the bottle is moved laterally by a displacement cylinder 47 which has its ram 48 connect to a swing bar 49 that engages the side of the bottle when it is actuated lifting and pushing (rolling) the bottle laterally from where it is resting on the spokes to a bottle apron 50 which is slightly concave as illustrated in FIG. 6. Since the bottle can acquire some inertia on being displaced from the spokes it is preferable that a bottle roll stop 51 be installed along the side of the bottle apron to cushion the inertia of the rolling bottle. This bottle roll stop can employ springs or use a pneumatic cylinder to provide the required cushioning.

Once the bottle B is positioned on the bottle apron 50, it can be loaded on the elevator magazine 34 by the bottle ram 52 which is located at the front 53 of the bottle apron. Typically this bottle ram is a hydraulic system which pushes the bottle off the apron onto two spaced apart elevator rails 54 mounted on the roller chains 55 on each side of the elevator magazine with rail brackets 56. It should be appreciated that these brackets can shifted on the roller chain to accommodate racks wherein the compartments 22 have different vertical spacing. The displacement cylinder 47, along with the bottle apron, the bottle stop 51 and the bottle ram 52 make up the bottle loading magazine 33.

In the elevator magazine 34 the two roller chains 55 on opposite sides of the magazine are synchronized so that the elevator rails 54 move in unison. Thus once a bottle B has been pushed onto these rails, a drive on these chains is engaged and the bottle is raised slightly more than one bottle diameter so that another set of empty rails are positioned adjacent to the bottle apron 50. The above described operation is repeated until the elevator magazine is fully loaded as is illustrated in FIG. 3.

In order to put the bottles B in the a rack, the rack must be positioned properly. In this regard the rack conveyor 35 is used to bring a rack, such as rack 21 shown in FIG. 2, into a position whereby the bottles shown in the elevator magazine in FIG. can be moved from this magazine into the rack. Such rack conveyors are fairly conventional and usually are composed of a rectangular frame 60 supported on a plurality of legs 61 above the floor on feet 62 which can be used to bolt it to the floor. The metal beams 63 and cross beams 64 of the fame support the rack conveyor chains 65 one located along each side of the unit which are also supported in drive drums 66 (see FIG. 4). Directly under these chains along the inside edges of the metal beams is a series of rollers or a support plate on which the chains track when the conveyor is activated. These plates support both the chains and a rack placed thereon. On the top of the frame is a vertical guide plate 67 and adjustable guide plate 68 on the opposite side, as illustrated in FIG. 3. Thus, once a rack is placed on the front end 69 of the rack conveyor it will be moved along the rack conveyor by the rack chains and aligned by the guides as it does so. In the rack conveyor illustrated two sets of conveyor chains are employed, the set described previously, and the set of conveyor chains 70 at the end of the rack conveyor, which allows for independent movement of racks loaded on the front end of the rack conveyor and those racks on the terminal end 71 of the conveyor where the second set of conveyor chains are located (see FIG. 4). Once a rack reaches the second set of conveyor chains it is positioned by the adjustable guide and aligned with the elevator mechanism 34. Under the power of these chains the rack moves forward until a sensor in the logic system determines a vertical row of compartments 22 are properly positioned to receive the filled bottles in the elevator magazine. At this time a hydraulic lock 72 engages the bottom of the rack and locks it on the conveyor so the rack cannot move.

From FIG. 6 it can be appreciated that the elevator rails 54 are spaced apart and mounted with rail brackets 56 connecting them to the roller chains 55 so that there is no obstruction between these rails. As a result of this arrangement, rack loading rams 75 (shown best in FIG. 4) can push all the bottles in the elevator magazine (as shown in FIG. 3) in the rack, positioned on the rack conveyor 35 and next the elevator magazine 34. Obviously since there are no obstructions between the elevator rails, the large rectangular ram face 76 can push through the magazine without obstruction moving the bottles in the elevator mechanism in to the rack. As to the bottom bottle in the magazine it can be pushed in to the rack by the bottle ram 52 assuming there is a new bottle on the bottle apron 50 (see FIG. 6) and this ram is sequenced to advance with rack loading rams 75.

Since the compartments 22 of the racks each have room for two bottles the load sequence is repeated to fill the compartments before the rack is advanced to align the next vertical row of compartments with the elevator mechanism. Obviously the hydraulic lock 72 must be released before the rack can be advanced and applied again once the next vertical row is compartments is properly positioned.

Figure 7:
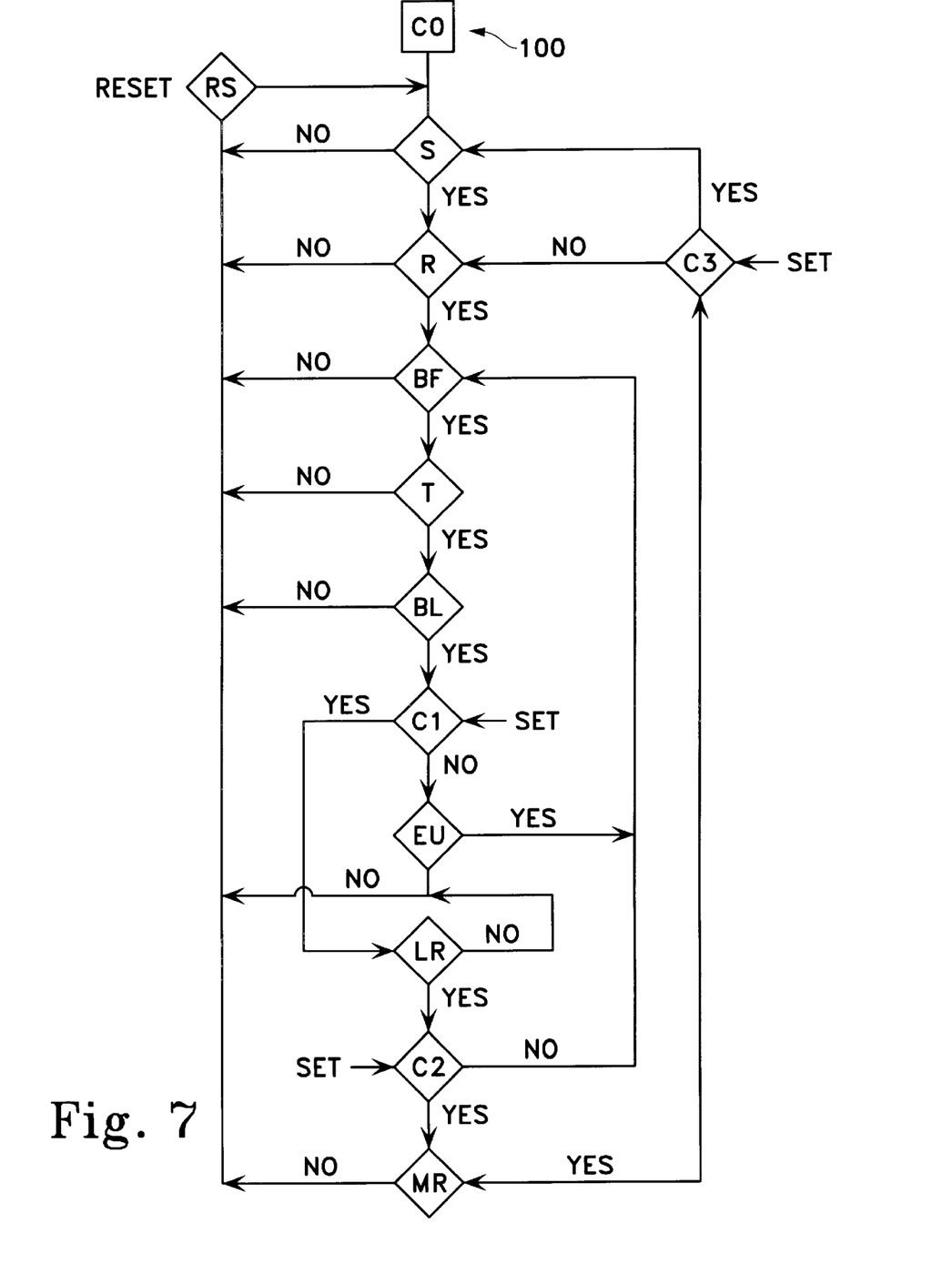
FIG. 7 is a schematic of the control logic used in the novel machine.

By referring to the simplified logic diagram illustrated in FIG. 7 the general operation of the novel machine 30 can be better understood. Since there are a number of dependant sequences ladder logic or PLC modules can be employed, such as those sold by Siemens. As to the general operation, the control system 36 includes an ON switch 100 by which the machine is started which causes the control system to check all its sensors and actuators to determine if they are ready to commence operation. The setup module S receives inputs from the various components, and if proper (true) starts the operation by activating the rack module R which determines that a rack is properly positioned along side of the elevator magazine 34 and locked in place. If the signals from the set up modules S and R are not true the modules will direct a reset module RS to re-sequence the machine, and as can be seen the other modules effect a reset if the logic determines there is a problem (see FIG. 7).

Once the bottle feed module BF determines if a bottle B is in the pin wheel mechanism 32 it signals the transition module T to turn one quarter turn to change the orientation of the bottle from a vertical orientation to a horizontal orientation which transition is sensed by the bottle load module BL which causes the bottle to be displaced from the pin wheel and positioned on the apron 50 and then loaded in to the elevator magazine 34 by the bottle loading magazine 33. If the operation is successfully accomplished, the first counter module C1 is signaled and if the manually set number has not been exceeded the counter signals the elevator module EU which causes the elevator to raise the bottle loaded therein. Once this occurs the elevator module signals the bottle feed module to process another bottle, by the process just described.

However when the first counter module C1 detects the manual setting has been reached (3 for rack 20 and 4 for rack 21) it will signal the load rack module LR to cause the rams in the elevator magazine 34 to push the bottles stacked in this magazine into the rack adjacent to the magazine. When this operation occurs a signal is sent to the second counter module C2 which determines if the rack in its current position has been loaded twice since as previously pointed out, each compartment 22 of the racks 20 and 21 hold two bottles. If the second counter indicates not full, then it activates the bottle feed module BF to process more bottles; if on the other hand the compartments are full, this counter activates the move rack module MR which unlocks the rack, and causes it to move forward by one row of compartments (there being either 3 or 4 vertical rows of compartment in the racks compatible with the machine see FIGS. 1 and 2). Once the rack as been moved the move rack module sends a signal to the third counter module C3 which is set for either 3 or 4 vertical rows of compartments. If the counter is not full, it then activates the rack module R to commence the process to fill another vertical row of compartments as described. If all the compartments are full, this counter activates the setup module S to fill another rack.

The logic schematic discussed indicates the general control and each module may have a number sensors and subroutines or operations associated with it to accomplish the generalized functions outlined.

To provide signals for the various modules different types of sensors are available, such as photo sensors and mechanically actuated switches. For example the photo sensors (not shown) may be used to determine the position of the racks on the rack conveyor 35 and if a bottle B is in the pin wheel mechanism 32. Likewise mechanical switches (not shown), including those sensitive to pressure, can be used to determine if a bottle is on the bottle apron 50 ready to be pushed into the elevator with the ram or shuttle 52. The logic diagram or schematic, along the availability of such sensors enables those skilled in the art to build sequencing control systems for the novel rack loading machine 30 in accordance the spirt of the invention.

Figure 8:
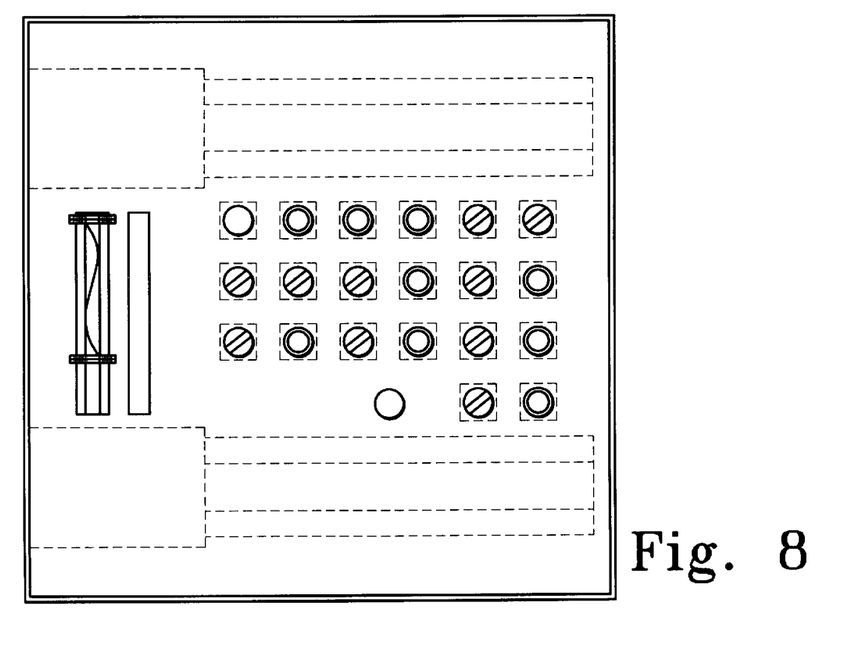
FIG. 8 is an elevation of the control panel for the operation of the novel machine.

FIG. 8 illustrates the face of the control panel 36 which can take on various forms depending on the control logic employed and therefore is not described further.

From the forgoing description of the machine it can be appreciated that it is relatively simple and there is easy access to the various components of the machine including the bottles passing through it which allows for simple maintenance and access to the bottles contained therein should there be a jamb.

Figure 5:
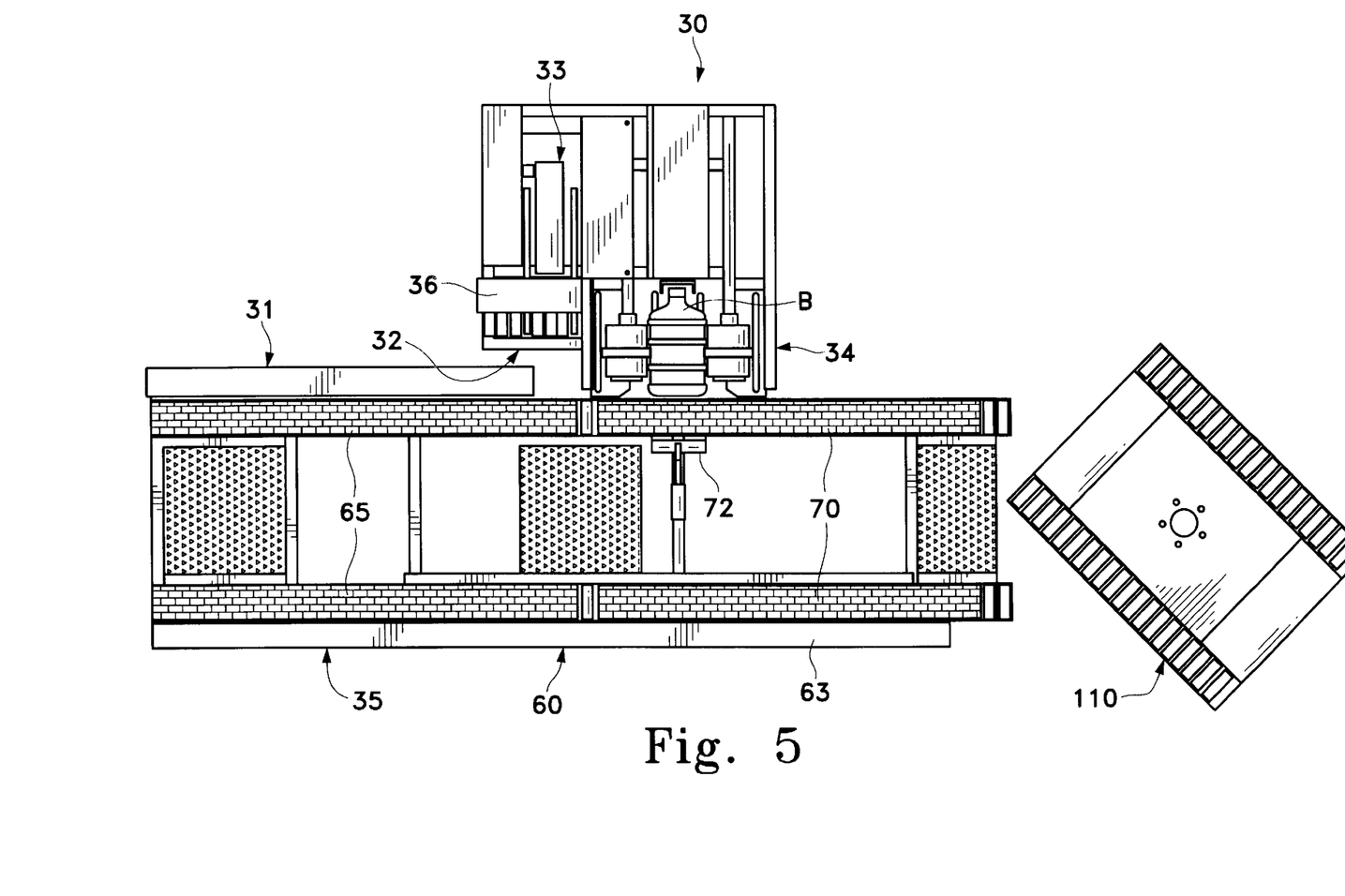
FIG. 5 is a top view of the novel machine illustrated in FIG. 4, showing many of the components reference in the description of FIG. 4.

Also shown in FIGS. 3, 4, and 5 is a turnstile 110 which is a conventional piece of hardware. Normally it is mounted at the terminal end of the rack conveyor 35 and positioned so that the unpowered conveyor on its top surface can receive a loaded rack from the rack conveyor. Once the loaded rack is on the turnstile, the turnstile and the loaded rack can be turned by hand so that a fork lift can access either side of the rack for moving the rack to storage or to a truck.

Having described the preferred embodiment, it should be appreciated that the machine can have other embodiments, such as, instead of using a vertical elevator for stacking the filled bottles, using a horizontal storage for the filled bottles in place of the vertical elevator, without departing for the spirit of the invention. Such an alternate embodiment is shown in FIGS. 9, 10 and 11.

Figure 9:
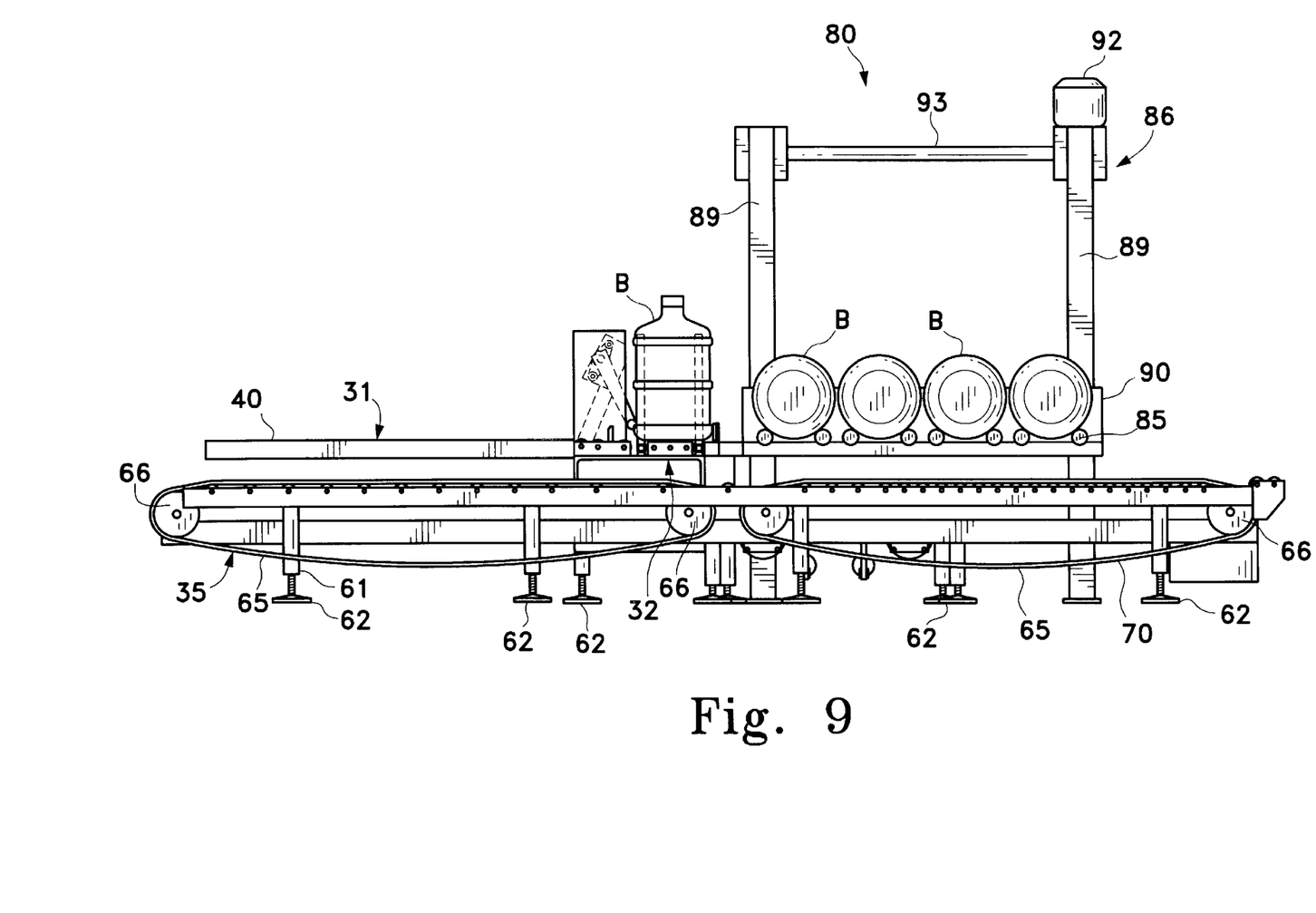
FIG. 9 is an elevation of an alternative embodiment of the invention in which the filled water bottles are stacked horizontally and then elevated as group for loading into an adjoining rack.
Figure 10:
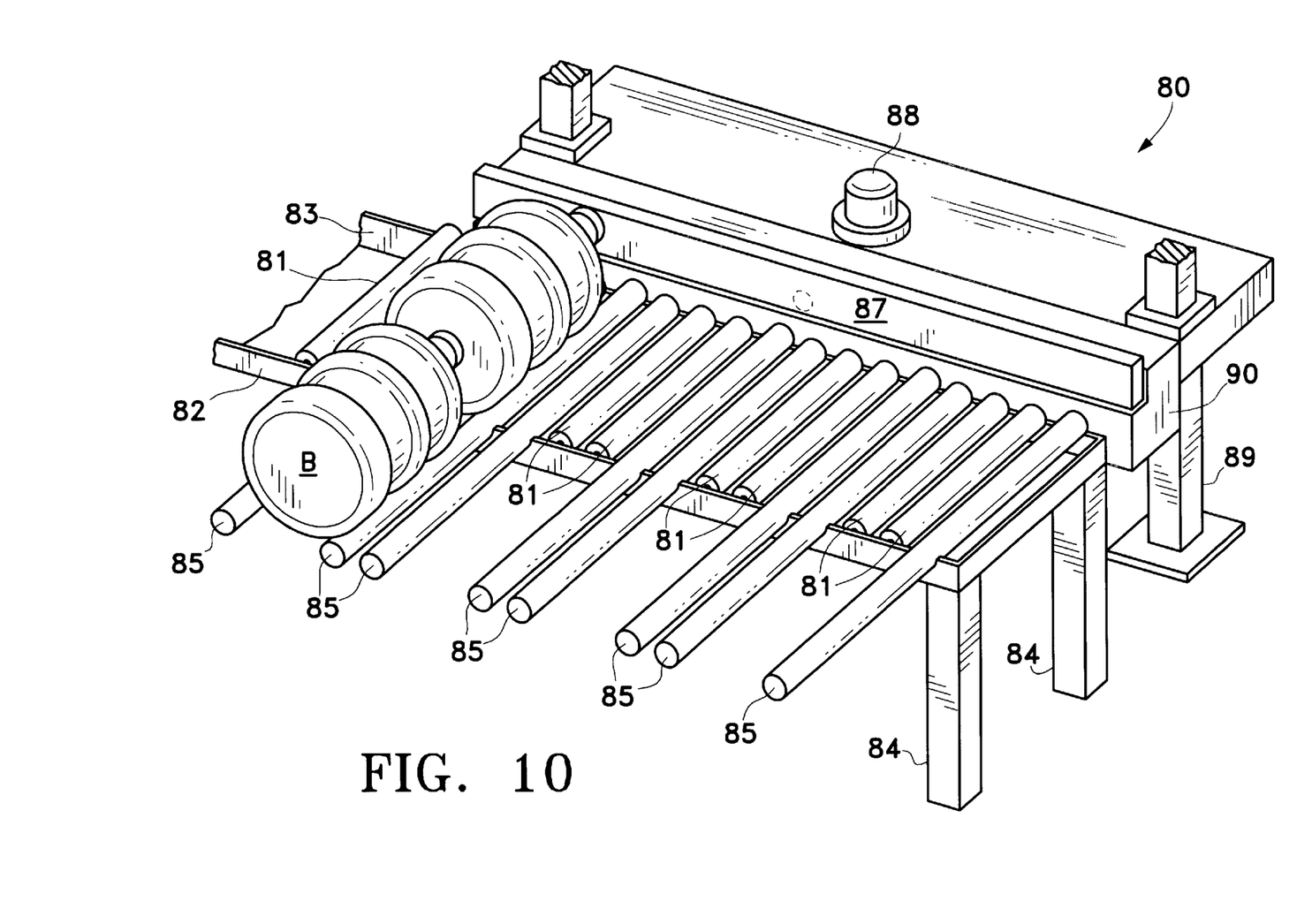
FIG. 10 is a broken away perspective of the horizontal stacking tray of the alternative embodiment shown in FIG. 9.

Referring to FIGS. 9 and 10 it can be seen that in this embodiment the machine is the same except for that the vertical elevator mechanism 34 has been replaced by a what might be called a horizontal elevator 80. This unit includes a series of rollers 81 mounted between two frame members 82 and 83 that have their ends connected to apron 50, shown in FIG. 6, and are supported on their opposite ends on legs 84. Interspersed between some of the rollers are elongated rollers 85 that are support by and extend from lift 86. These elongated roller are not supported by frame member 82 and 83 but are positioned in the same plane as rollers 81 so that these several rollers form a horizontal conveyor extending from the apron 50. Further the bottle stop shown in FIG. 6 is removed, Thus it can be appreciated that as the bottle on the pin wheel is moved laterally by displacement cylinder 47, which has its ram 48 connect to a swing bar 49 that engages the side of the bottle thereby it is lifted and pushed (rolling) from where it is resting on the spokes to a bottle apron 50 (see FIG. 6) it will force a bottle already resting on the apron down the above described horizontal conveyor.

Figure 11:
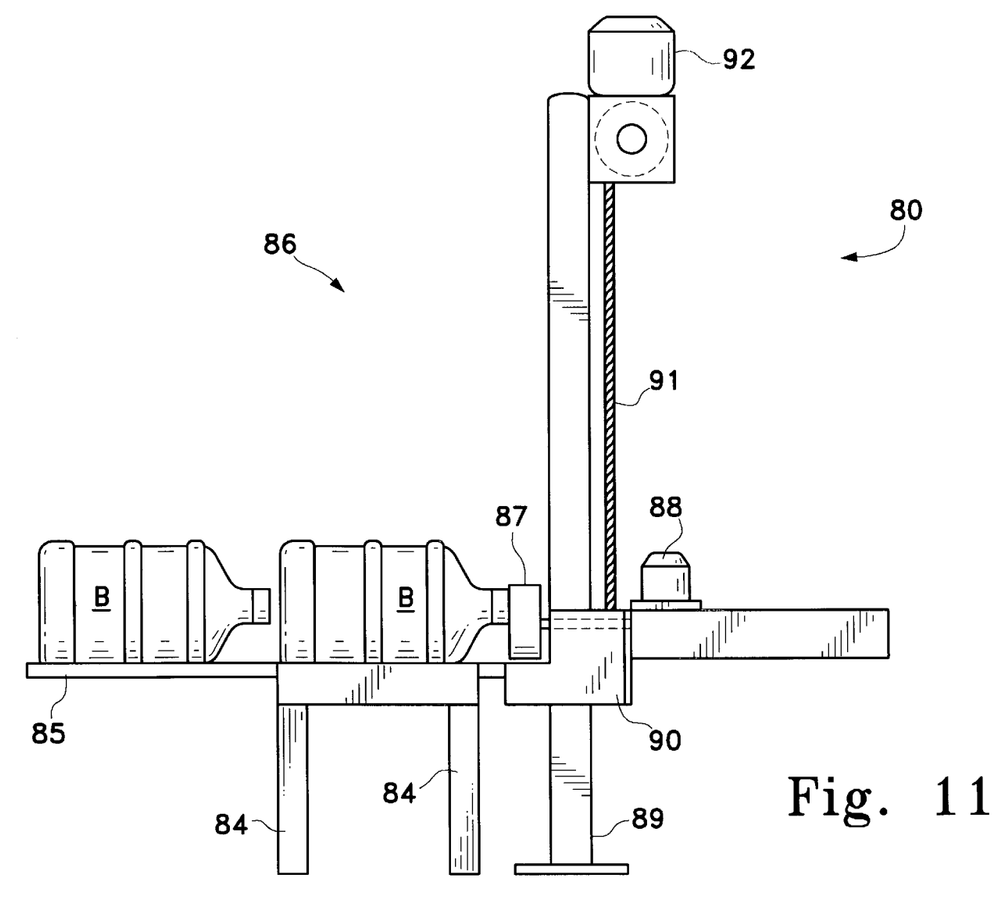
FIG. 11 is an end elevation of the alternative embodiment shown in FIG. 9 showing just the horizontal elevator.

As the elongated rollers 85 extend beyond frame 82, and not attached to it or frame 83, a bottle B can be stored on the extending ends of these rollers, as shown in FIG. 10 and 11. Thus as bottles B travel down the horizontal conveyor on rollers 81 and 85, when the requisite number of bottles are on the conveyor, a ram 86 on the lift 86 can be actuated through motor 88 to move bottles on the conveyor to the ends of the elongated rollers as shown, thereby allowing another row of bottles to progress down the horizontal conveyor.

After one row of bottles B have been stored on the ends of the elongated rollers 85 and another row is behind the stored bottles, see FIG. 11, and a rack 21 or 22 is on the rack conveyor locked, lift 86 may actuated to align these bottles with the horizontal compartments in the rack. This is accomplished by the lift 86 that includes two vertical posts 89 on which is mounted a carrier 90 that is free to travel upon and down on these posts. The vertical position of the carrier is controlled by a screw drive consisting of threaded rod 91 adjacent to each post, driven by a motor 92 at the top of one of the posts, which are journal led in the carrier. A drive rod 93 connect the two threaded rods so they are synchronized. As a result the lift will operate much like a fork lift, raising six or eight filled bottles (depending on the rack capacity) to the appropriate level for a loading rack. When the level has been reached, the ram 87 pushes all the bottles into the rack.

In this embodiment the rack is never repositioned, while in the preferred embodiment the rack is moved for each vertical row.

Other variation of the invention, besides those discussed are possible and it is not the intent of the inventors to limit the scope of their invention by the descriptions herein.

Having described our invention we claim:

1. In a rack loading machine for large bottles, a pin wheel bottle repositioning unit comprising:

an elongated armature mounted for rotation in said unit with its longitudinal axis located horizontally;

a plurality of spokes mounted on said armature normal to the longitudinal axis of said armature and extending at 90 degree intervals in spaced apart paired, parallel relationships defining four compartments on said armature, in feed means operable to deliver bottles to be repositioned to one of said compartments so the base of such bottle will be supported on one pair of said spokes positioned horizontally and such bottle will be adjacent to another pair of said spokes positioned vertically in said compartment, control means operable to rotate said armature one quarter turn when such bottle is in said compartment in a direction that said spokes in a vertical position will support such bottle as said spokes move from a vertical position to a horizontal position as a result of the quarter turn, whereby the orientation of such bottle will be changed from a vertical position to horizontal position; and out feed means operable to displace such bottle from said compartment after said armature has been rotated one quarter turn by said control means so the cycle may be repeated.

2. The bottle repositioning unit defined in claim 1 wherein the in feed means is a conveyor.

3. The bottle repositioning unit defined in claim 1 wherein the out feed means includes a hydraulic ram operable to laterally displace a bottle in a compartment after such bottle has been repositioned.

4. The bottle repositioning unit defined in claim 1 wherein the control means includes a first sensor means to detect a bottle from the in feed means is positioned in a compartment and a second sensor means to determine the presence of a bottle in a compartment after such bottle has been re-oriented, said sensors operable to provide sequencing information for said control means.

* * * * *